US006899319B2

(12) United States Patent
Hung

(10) Patent No.: US 6,899,319 B2
(45) Date of Patent: May 31, 2005

(54) JACKS HAVING A DETACHABLE REAR-END HANDLE

(75) Inventor: Victor Hung, Lu Chu Hsiang (TW)

(73) Assignee: MVP (H.K.) Industries Limited, North Point (HK)

( * ) Notice: Subject to any disclaimer, the term of this patent is extended or adjusted under 35 U.S.C. 154(b) by 107 days.

(21) Appl. No.: 10/642,752

(22) Filed: Aug. 19, 2003

(65) Prior Publication Data

US 2005/0040379 A1 Feb. 24, 2005

(51) Int. Cl.[7] .................................................. B60P 1/48
(52) U.S. Cl. ................................ 254/8 B; 254/DIG. 3; 254/1
(58) Field of Search ................................ 254/8 B, 7 B, 254/9 B, 10 B, 6 B, 2 B, 124, DIG. 3, 1, 93 R; 16/110 R; 74/593

(56) References Cited

U.S. PATENT DOCUMENTS 4,714,013 A * 12/1987 Telfer .......................... 99/449
4,964,617 A * 10/1990 Lawrence ................... 254/8 B
6,848,673 B1 * 2/2005 McLaughlin et al. ....... 254/8 B

* cited by examiner

*Primary Examiner*—Robert C. Watson
(74) *Attorney, Agent, or Firm*—Bacon & Thomas PLLC

(57) ABSTRACT

A jack having a detachable rear-end handle comprises a wheeled jack and a hand-held ring. Two sidewalls of the jack are each provided with a pair of blocking pieces respectively mounted on an upper location and a lower location about a screw nut of a rear shaft. The hand-held ring can be coupled to screw nuts of a rear shaft. The blocking pieces further restrict the rotation of the hand-held ring. The connection of the hand-held ring at the rear end of the jack not only facilitates carrying the jack but also controlling the movements of the jack to a proper lift point.

5 Claims, 5 Drawing Sheets

JACKS HAVING A DETACHABLE REAR-END HANDLE

BACKGROUND OF THE INVENTION (a) Field of the Invention

The present invention relates to jacks having a detachable rear-end handle, more particularly to a wheeled jack having a hand-held ring connected to the screw nuts of the rear shaft for facilitating transporting the jack and adjusting the supporting plate thereof to a proper lift point.

(b) Description of the Prior Art

The wheeled jacks of the prior art do not have a handle or a hand-held ring for a portable transportation. To carry a wheeled jack, it is therefore necessary to put the jack in a hand-held bag or a box. It is an alternative that some wheeled jacks are provided with a hand-held ring connected to the outer walls of the sidewalls at a middle shaft. Since the jack extends horizontally when being lifted, it tends to waver about a horizontal plane, which leads to unexpectedly collisions with surrounding objects. It is a further disadvantage that a hand-held ring on the middle section of the sidewalls cannot assist pushing the jack toward a selected lift point under a huge object such as a vehicle.

SUMMARY OF THE INVENTION

Accordingly, the primary objective of the present invention is to provide a jack having a detachable rear-end handle, wherein, on each side of the rear portion of the sidewalls, two blocking pieces are each mounted on an upper location and a lower location close to the screw nut of a rear shaft. Those blocking pieces are for restricting the rotation of a hand-held ring. Since the hand-held ring is connected to the rear end of the jack, the jack is in a vertical configuration when being lifted, so as to avoid collisions between the jack and surrounding objects. When lying on the ground, the rear-end handle can be used to control the horizontal movement of the jack so as to aim the supporting plate of the jack at a selected lift point on the bottom of a vehicle.

The secondary objective of the present invention is to provide a jack having a detachable rear-end handle, wherein the blocking pieces about the screw nuts of the rear shaft of the sidewalls can be a pair of pins, a pair of bulged objects, an integrally punch-formed plate or any other configurations capable of restricting the rotation of the hand-held ring.

The various objects and advantages of the present invention will be more readily understood from the following detailed description when read in conjunction with the appended drawings.

DETAILED DESCRIPTION OF THE PREFERRED EMBODIMENTS

Figure 1:
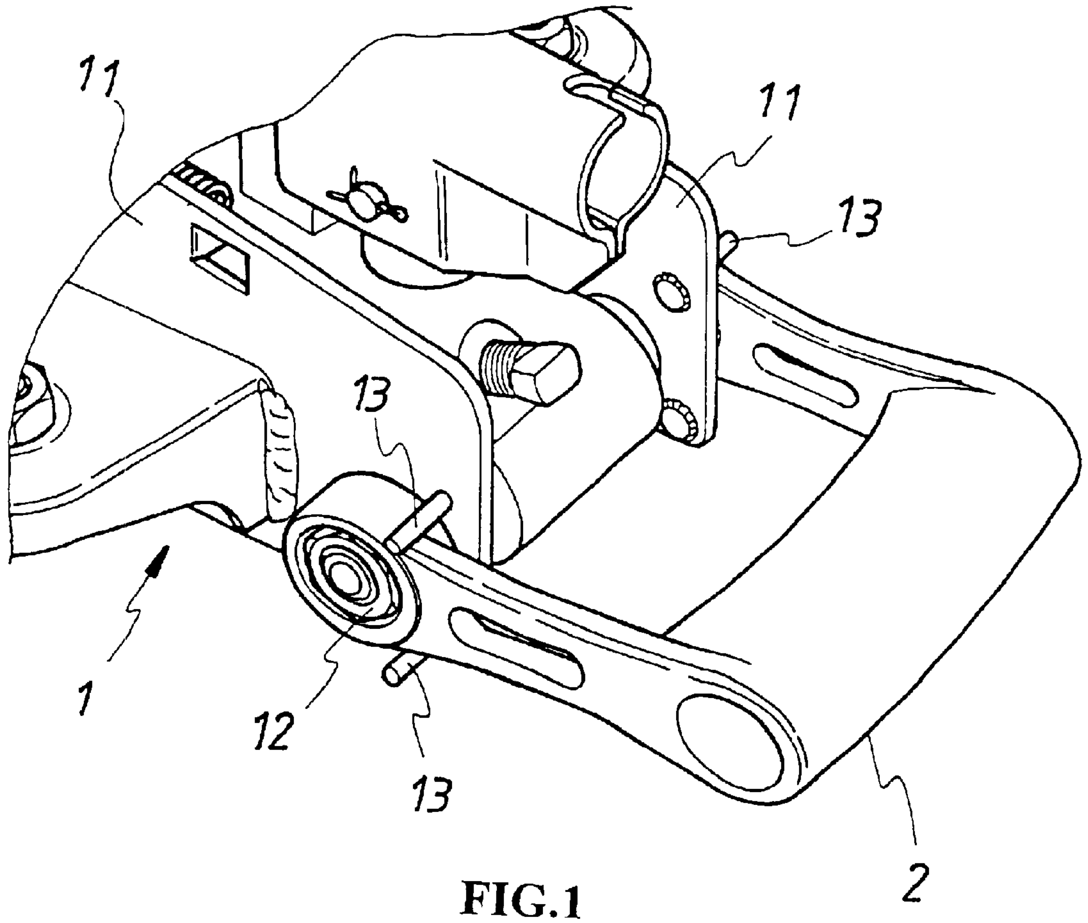
FIG. 1 is a perspective view of a local section of the present invention.
Figure 2:
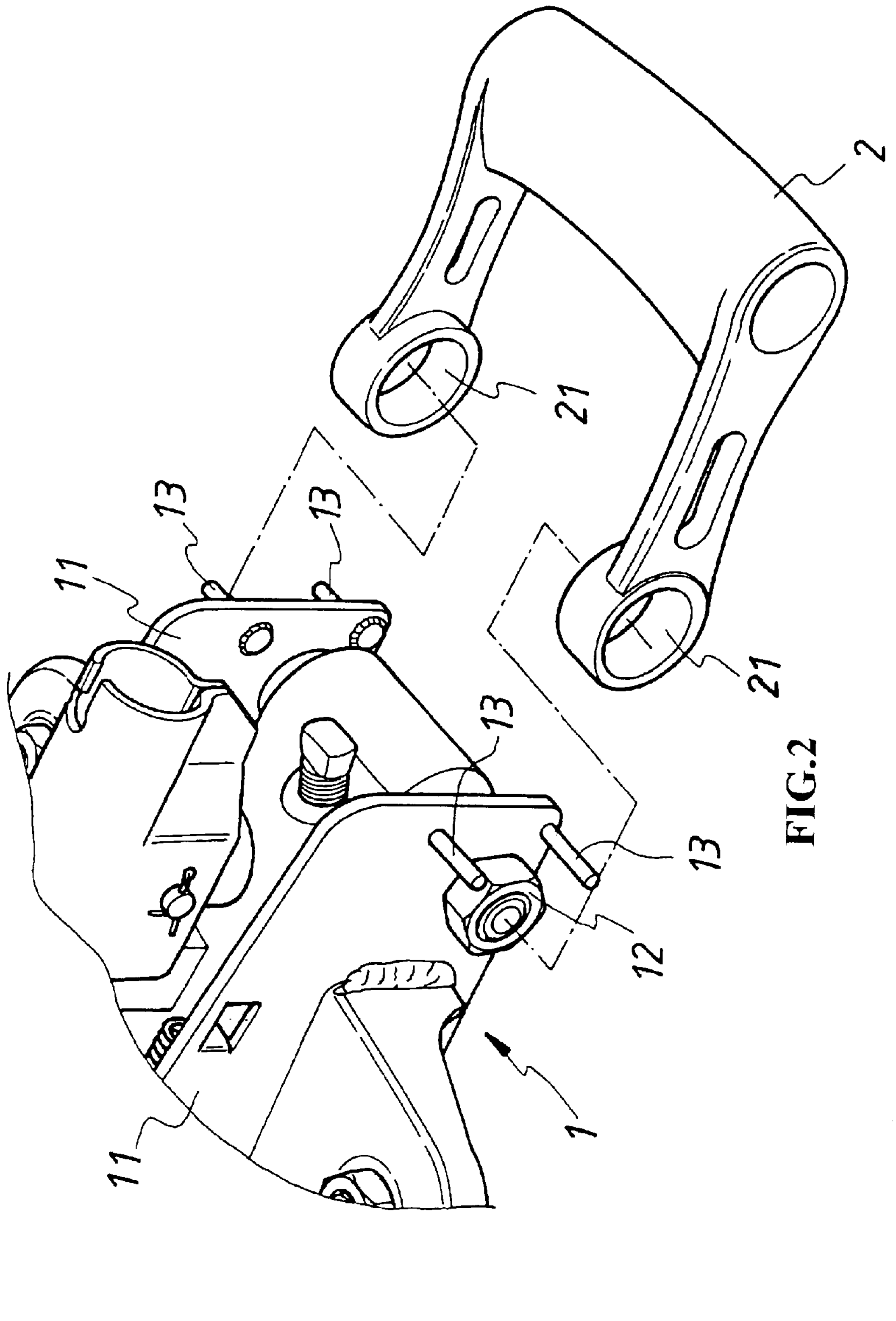
FIG. 2 is a perspective view of a local section of the present invention in which the hand-held ring is detached.

Referring to FIG. 1 and FIG. 2, a jack having a detachable rear-end handle according to the present invention comprises a jack 1 and a hand-held ring 2, wherein the jack 1 has four wheels and two sidewalls of the jack 1 are each provided with two blocking piece 13, respectively on an upper location and a lower location close to a screw nut of a rear shaft 12. The upper and lower blocking pieces 13 may be embodied in a pair of pins, as shown in FIG. 1 and FIG. 2, or a pair of bulged objects in arbitrary shapes.

Figure 3:
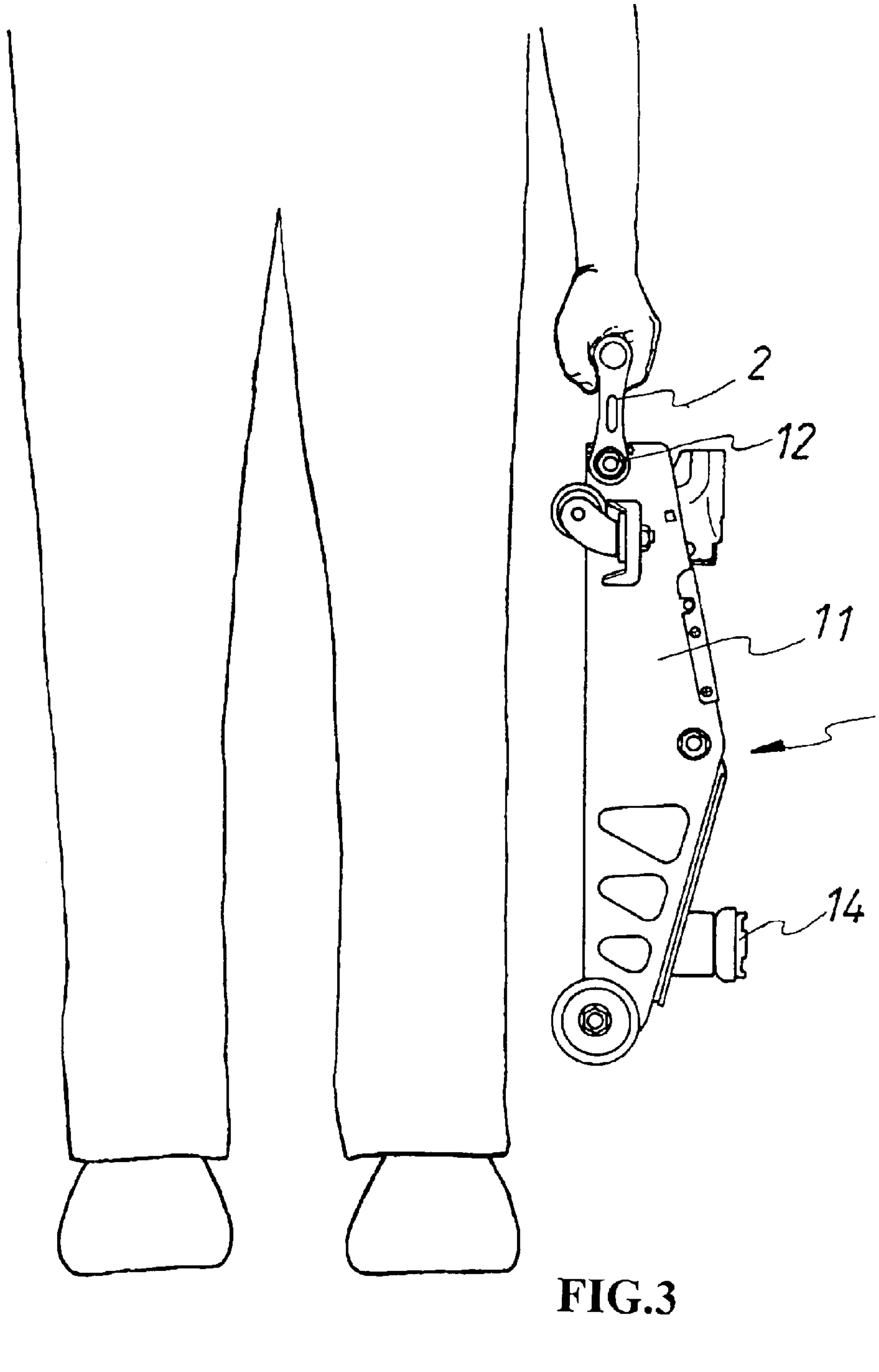
FIG. 3 illustrates the present invention in a vertical configuration when being lifted.

The hand-held ring 2 is a handle bar with two perpendicularly extended arms respectively at two ends thereof. Each arm has an encircling hole 21 at the free end thereof. The encircling holes 21 are respectively engaged with corresponding screw nuts of a rear shaft 12, as shown in FIG. 2, and thereby the hand-held ring 2 connects with the screw nuts of a rear shaft 12 to form a rear-end handle. The upper and lower blocking pieces 13 are for restricting the rotation of the hand-held ring 2 so as to prevent the wavering of the jack when it is lifted upright, as shown in FIG. 3. This mechanism secures the jack from collisions with surrounding objects during transportation.

Figure 4:
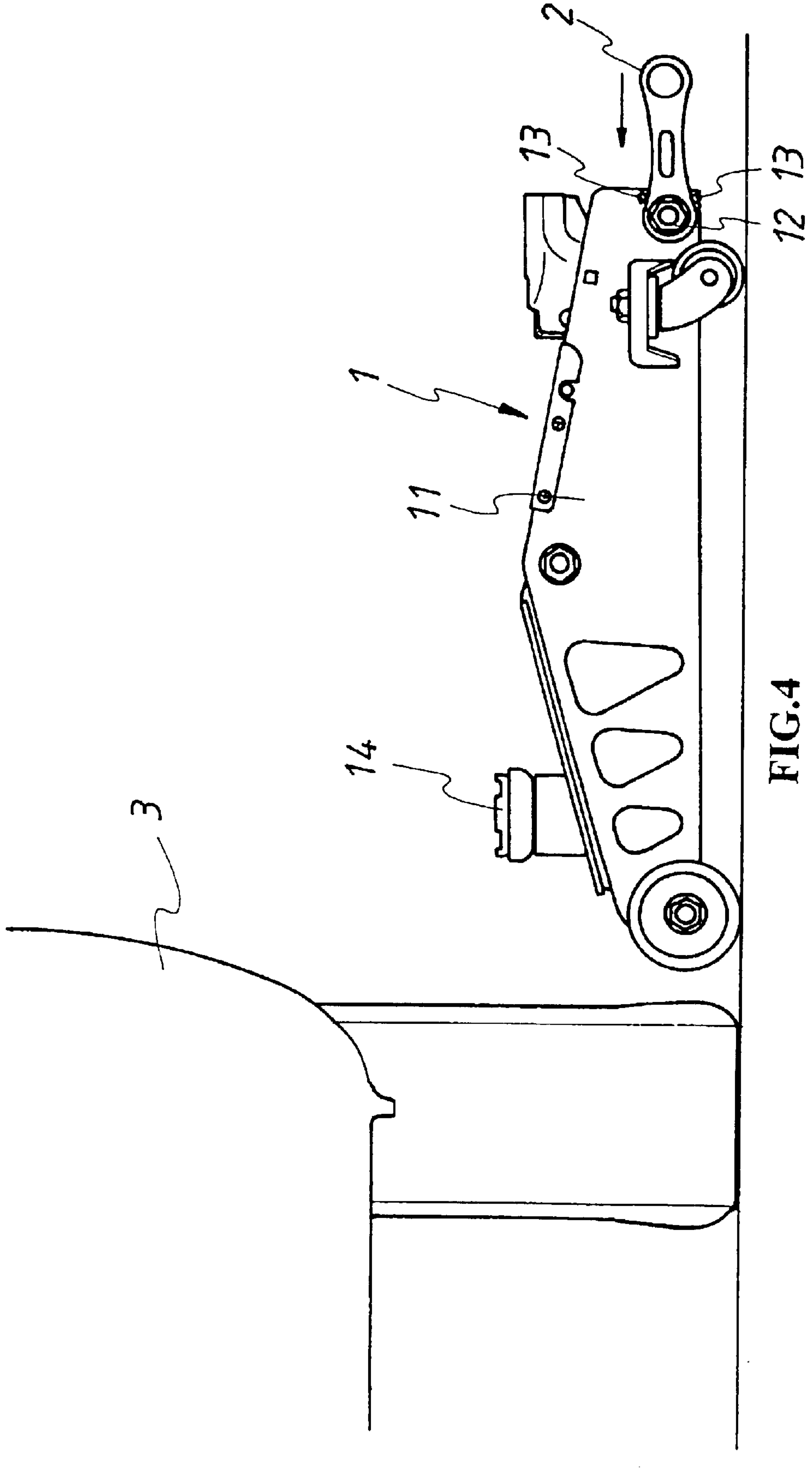
FIG. 4 illustrates the movement of the present invention being controlled by driving the hand-held ring.
Figure 5:
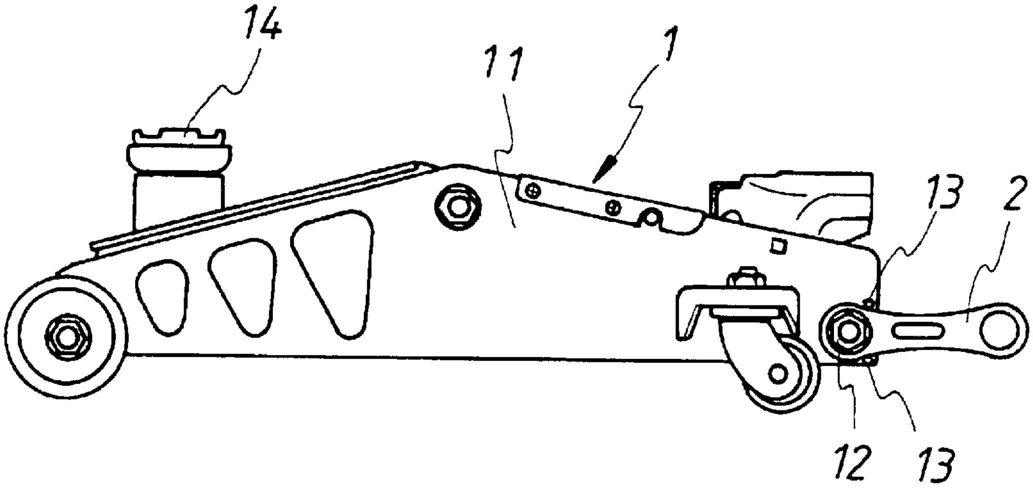
FIG. 5 is a side view of the present invention as the hand-held ring is combined with the wheeled jack.

Referring to FIG. 4, when the present invention is lying on the ground, the hand-held ring 2 can be manipulated to move the jack 1 and to further adjust the supporting plate 14 thereon to a selected lift point on the bottom of a vehicle body 3. Therefore, a hand-held ring 2, as positioned at the rear end of a jack 1, indeed enhances the handiness of the jack 1.

The above-mentioned hand-held ring 2 is preferably made of flexible materials such as plastics, for that two lateral arms of the hand-held ring 2 can be properly extended outwardly to put the encircling holes 21 around the screw nuts of a rear shaft 12. To take the hand-held ring 2 off the jack 1, the lateral arms of the hand-held ring 2 are again extended so that the encircling holes 21 are decoupled from the screw nuts of a rear shaft 12.

Figure 6:
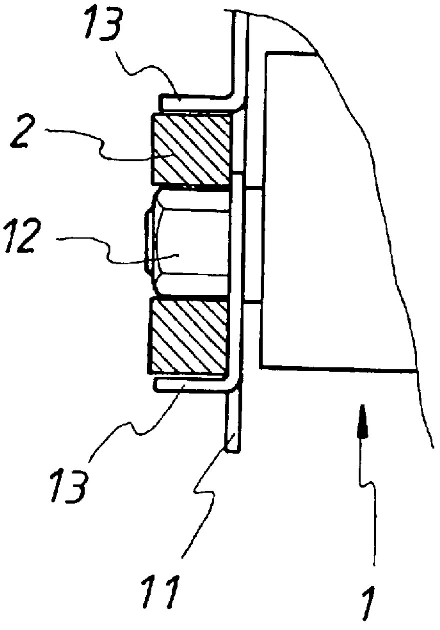
FIG. 6 is a cross-sectional lateral view of an integrally punch-formed blocking plate on a sidewall of the present invention.

According to the present invention, besides a pair of pins and a pair of bulged objects, the upper and lower blocking pieces 13 may also be embodied in a single plate punch-formed on each of the sidewalls 11 of the jack 1, as shown in FIG. 6. The plate replaces the upper and lower blocking pieces 13 to restrict the rotation of the hand-held ring 2. The present invention is thus described, and it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A jack having a detachable rear-end handle comprising a jack being a wheeled jack having two sidewalls each provided with a pair of blocking pieces respectively mounted on an upper location and a lower location about a screw nut of a rear shaft of said jack; and a hand-held ring being a handle bar integrally connected with two side arms respectively at two ends thereof, a free end of each side arm being provided with an encircling hole for being coupled with a corresponding screw nut of a rear shaft of said jack, said hand-held ring, thereby coupled with said screw nuts of a rear shaft, forming a rear-end handle for said jack.

2. The jack having a detachable rear-end handle of claim 1, wherein each said pair of blocking pieces is a pair of pins.

3. The jack having a detachable rear-end handle of claim 1, wherein each said pair of blocking pieces is a pair of bulged objects.

4. The jack having a detachable rear-end handle of claim 1, wherein said hand-held ring is made of flexible materials such as plastics.

5. The jack having a detachable rear-end handle of claim 1, wherein each said pair of blocking pieces is a single curved plate punch-formed on a respective sidewall of said jack.

* * * * *